(12) United States Patent
Conry

(10) Patent No.: US 8,707,698 B2
(45) Date of Patent: Apr. 29, 2014

(54) MODULAR ENERGY HARVESTING SYSTEM

(76) Inventor: Ronald David Conry, Tallahassee, FL (US)

(*) Notice: Subject to any disclaimer, the term of this patent is extended or adjusted under 35 U.S.C. 154(b) by 404 days.

(21) Appl. No.: 13/293,584

(22) Filed: Nov. 10, 2011

(65) Prior Publication Data

US 2012/0111004 A1    May 10, 2012

Related U.S. Application Data

(60) Provisional application No. 61/412,133, filed on Nov. 10, 2010.

(51) Int. Cl.
*F03G 7/00* (2006.01)
*F01K 25/08* (2006.01)

(52) U.S. Cl.
USPC .............. 60/641.2; 60/651; 60/671; 60/698

(58) Field of Classification Search
USPC .......... 60/641.1, 641.2, 641.8, 651, 655, 671, 60/676, 698
See application file for complete search history.

(56) References Cited

U.S. PATENT DOCUMENTS

| | | | | |
|---|---|---|---|---|
| 1,951,359 A * | 3/1934 | Holzwarth | ................... | 60/39.17 |
| 4,982,569 A * | 1/1991 | Bronicki | .......................... | 60/698 |
| 6,128,903 A * | 10/2000 | Riege | ........................... | 60/641.8 |
| 6,494,042 B2 * | 12/2002 | Bronicki | ......................... | 60/651 |
| 7,469,541 B1 * | 12/2008 | Melton et al. | ................. | 60/641.1 |
| 2009/0277400 A1 * | 11/2009 | Conry | ............................... | 123/2 |

* cited by examiner

*Primary Examiner* — Hoang Nguyen
(74) *Attorney, Agent, or Firm* — J. Wiley Horton

(57) ABSTRACT

A modular energy harvesting system. The system preferably uses an organic Rankine cycle heat engine to recover energy from relatively low-temperature heat sources. The system is both modular and scalable. The components are preferably housed within shipping containers so that they may be easily transported by sea and over land. Two or more power harvesting modules may be assembled on a single site to increase the production capacity in a scalar fashion. Each of the integrated units preferably includes an oil-less turbine and motor.

20 Claims, 11 Drawing Sheets

MODULAR ENERGY HARVESTING SYSTEM

CROSS-REFERENCES TO RELATED APPLICATIONS

This application claims the benefit pursuant to 37 C.F.R. §1.53(c) of an earlier-filed provisional patent application. The parent application was filed on Nov. 10, 2010 and was assigned Application Ser. No. 61/412,133. It listed the same inventor.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

1. Field of the Invention

This invention relates to the field of energy. More specifically, the invention comprises a modular energy harvesting system, suitable for harvesting energy from available heat sources.

2. Description of the Related Art.

Organic Rankine cycle heat engines are well suited to the recovery of energy from relatively low temperature heat sources. Such heat sources include biomass reactors, concentrated solar collectors, engine exhaust, industrial waste heat, heat extracted from mines, and geothermal sources such as deep crystalline bedrock. A particularly promising example is "enhanced" geothermal energy. This example will be used for the disclosure of the present invention, but the reader should bear in mind that the invention is equally applicable to many other heat sources.

Enhanced geothermal energy systems seek to extract energy from deep "hot dry rocks" by circulating a working fluid (typically water) through the rock. Once a suitable site is located, an injection well is drilled down into the rock strata. Such a well may be drilled as deep as 4,000 to 8,000 meters below the surface.

One or more return wells are drilled down into the same strata. Hydraulic fracturing may be used to fracture the strata so that water may more easily pass through from the injection well(s) to the return well(s). Proppant material may also be added to the strata to maintain the desired flow rates.

A working fluid is circulated through the rock strata. For deep strata this will typically be water. Pressurized water is pumped down through the injection well(s). It seeps through the strata and then returns to the surface via the return well(s). In passing through the rock strata the water absorbs considerable heat. As an example, water pumped in at an ambient temperature of 17 degrees C. may emerge at 180 degrees C. or more. Thus, the circulating water has carried some of the thermal energy found at great depths within the earth to the surface.

Geothermal heat is available over a wide temperature range. Those knowledgeable in the field of thermodynamics know that the operation of a hest engine is more dependent on the temperature spread between the boiler and the ambient conditions surrounding the condenser than it is on the absolute temperature of the heat source. Thus, in cold climates, a heat source of only 60 degrees C. is still useful because the condenser may be rejecting heat to a −10 degrees C. environment.

Of course, a 180 degree C. heat source contains more available energy. Even so, it is not hot enough to be suitable for traditional steam-based energy harvesting cycles. An organic Rankine cycle engine, however, is able to effectively utilize a heat source in this temperature range. Accordingly, organic Rankine cycle engines have been proposed for use with enhanced geothermal sources.

FIG. 1 schematically depicts such an arrangement. Organic Rankine Cycle ("ORC") engine 10 may include multiple turbine stages, reheat, and other components known to those familiar with this technology. The version shown is the simplest embodiment. A working fluid is vaporized in boiler 20 then fed through turbine feed line 36 to turbine 22. The mechanical energy extracted by the turbine spins generator 24 (or in some instances may provide direct mechanical power). Turbine exhaust line 42 takes the turbine exhaust into condenser 26, where it is condensed back into liquid form. Feed pump 18 pulls the liquid out of the condenser through condenser suction line 38 and compresses it to the boiler operating pressure before feeding it out through boiler feed line 40. Thus, the ORC engine is a circulating loop whereby energy is harvested from an available heat source.

The heat source in this particular example is geothermal energy. The term "boiler" is used for element 20 in FIG. 1, since this is the traditional term used for a heat engine cycle. One may conventionally think of a combustion-based heat source being used in conjunction with a boiler. This is not the case for geothermal applications. The heat source for geothermal applications is hot water. Thus, boiler 20 may also be referred to as a heat exchanger in which heat is transferred from a hot, pressurized working fluid to the vaporizing refrigerant used in the ORC engine.

The hot working fluid is provided by geothermal energy. Certain geological formations provide a good source of useful heat. In this example, the heat source is a very deep and dry rock formation which has an overlying insulating layer of sedimentary rock. Injection pump 16 pressurizes the working fluid (typically water) and feeds it down injection well 28. It is injected into, a layer of hot dry rock 12 which may be as much as 4,000 to 8,000 meters below the surface.

The injected water seeps through fractured passage 14 and eventually into return well 30 which returns it to the surface. The large water passage shown does not represent the true nature of the water path. In reality, the water will flow through a complex path of small fissures. As it flows, the water is heated by the surrounding rock. By the time the water emerges from return well 30, it could be heated to over 200 degrees Centigrade. This water is then fed through boiler 20 where it transfers heat to the working fluid in the ORC engine.

A single, injection pump 16 is shown, but those skilled in the art will know that two or more pumps maybe used at various locations in the circulation loop of the enhanced geothermal well system. Likewise, it is common to use multiple injection wells and multiple return wells.

Water is currently the preferred working fluid for the geothermal circulation loop. However, other working fluids are certainly possible. Supercritical carbon dioxide is now being investigated as a possible working fluid.

The working fluid within the cyclic ORC engine itself must be selected to have appropriate phase change points in comparison to the temperature of the available heat source. The following table presents examples of ORC working fluids along with a listing of some of their physical properties:

TABLE I

| Common Name | IUPAC Name | Mol. Wt. (g/mol) | F.P. (° C.) | B.P. (° C.) |
|---|---|---|---|---|
| R-22 | chloro-difluoro methane | 86 | −135 | −40.8 |
| R-114 | 1,2-dichloro-1,1,1,2-tetrafluorethane | 171 | −94 | 3.6 |
| R-133a | 1-chloro-1,1,1-trifluoro ethane | 118 | −106 | 6.9 |
| R-134a | 1,1,1,2-tetrafluoro-ethane | 102.03 | — | −26.5 |
| ammonia | ammonia | 17.03 | −77.7 | −33.4 |
| toluene | methyl benzene | 92.1 | −95 | 110 |
| butane | butane | 73.1 | −138.4 | −0.5 |
| Dowtherm E | 0-dichlorobenzene | 166 | −48 | |
| Genetron 245fa | 1,1,1,3,3-pentafluoro-propane | 134 | | 15.3 |

The more toxic candidates—such as toluene—are not likely to be used in a large application where an accidental leak is always a concern. Thus, relatively benign compounds such as R-134a and Genetron 245fa are more likely.

The, use of hydraulic fracturing to improve the performance of enhanced geothermal sites can produce unwanted seismic activity. The injection of proppants may in some instances be undesirable near populated areas. Thus, enhanced geothermal energy harvesting plants are often located in remote areas.

It is also difficult to predict the performance of the injection and return wells due to the difficulty in determining the porosity of rock strata thousands of meters below the surface. Thus, it is advisable to test the performance of one or two small wells before committing to establishing a large-scale facility. From these considerations the reader will understand that an ORC energy harvesting device suitable for use in the enhanced geothermal energy field is preferably scalable. The present invention provides just such a device.

BRIEF SUMMARY OF THE PRESENT INVENTION

The present invention comprises a modular and scalable energy harvesting system. The system preferably uses an organic Rankine cycle heat engine to recover energy from relatively low-temperature heat sources. The components are preferably housed within standard shipping containers so that they may be easily transported by sea and over land. Each energy harvesting module contains a complete heat engine.

Two or more energy harvesting modules may be assembled on a single site to increase the production capacity in a scalar fashion. The multiple modules are preferably controlled from a single location. Each module may produce AC power, or alternatively, some modules may transmit DC power to a power transmission unit which collects the DC power and converts it to AC power. In yet another embodiment the system may transmit DC power directly to an electrical load. Each energy harvesting module preferably includes an integrated turbine/generator unit. These integrated units preferably include an oil-less turbine and motor.

REFERENCE NUMERALS IN THE DRAWINGS

| | | | |
|---|---|---|---|
| 10 | ORC engine | 12 | hot dry rock |
| 14 | fractured passage | 16 | injection pump |
| 18 | feed pump | 20 | boiler |
| 22 | turbine | 24 | generator |
| 26 | condenser | 28 | injection well |
| 30 | return well | 32 | hot water line |
| 34 | water return line | 36 | turbine feed line |
| 38 | condenser suction line | 40 | boiler feed line |
| 42 | turbine exhaust line | 44 | forty foot container |
| 46 | twenty foot container | 48 | joint |
| 50 | transport carrier | 52 | jack post |
| 54 | turbine/generator | 56 | lifting mount |
| 58 | energy harvesting module | 60 | condenser section |
| 62 | turbine section | 64 | power transmission unit |
| 66 | control room | 68 | DC feed line |
| 70 | hot fluid header | 72 | return fluid header |

DETAILED DESCRIPTION OF THE INVENTION

As discussed initially, the present invention is capable of harvesting energy from a wide variety of heat sources. It is advantageous to the reader's understanding to discuss the invention with respect to one particular example. Accordingly, the example of harvesting energy from a geothermal source will be discussed in detail. However, the reader should bear in mind that the invention is applicable to many other potential heat sources.

Figure 1:
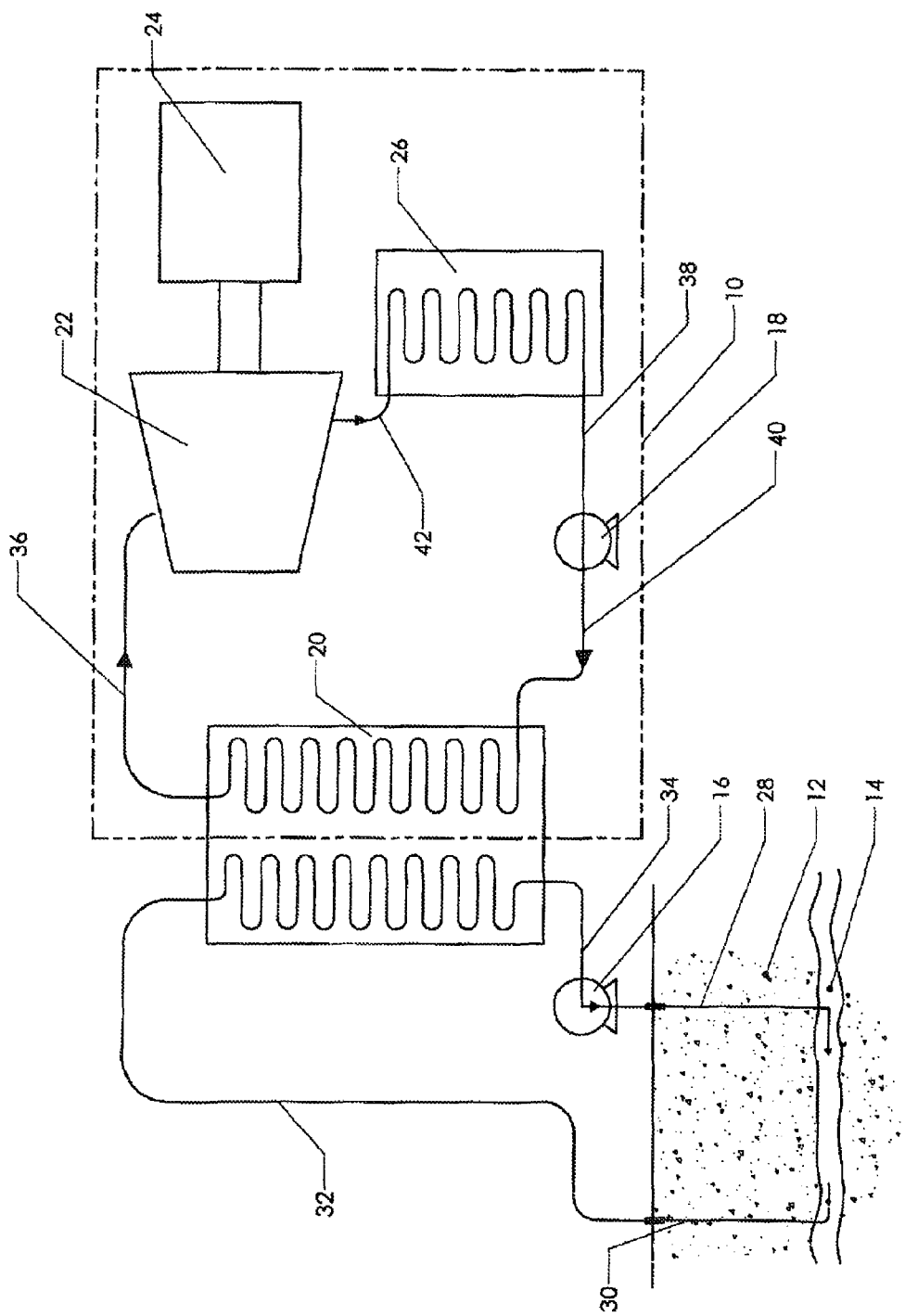
FIG. 1 is a schematic view, showing the application of an ORC engine to an enhanced geothermal energy source.
Figure 2:
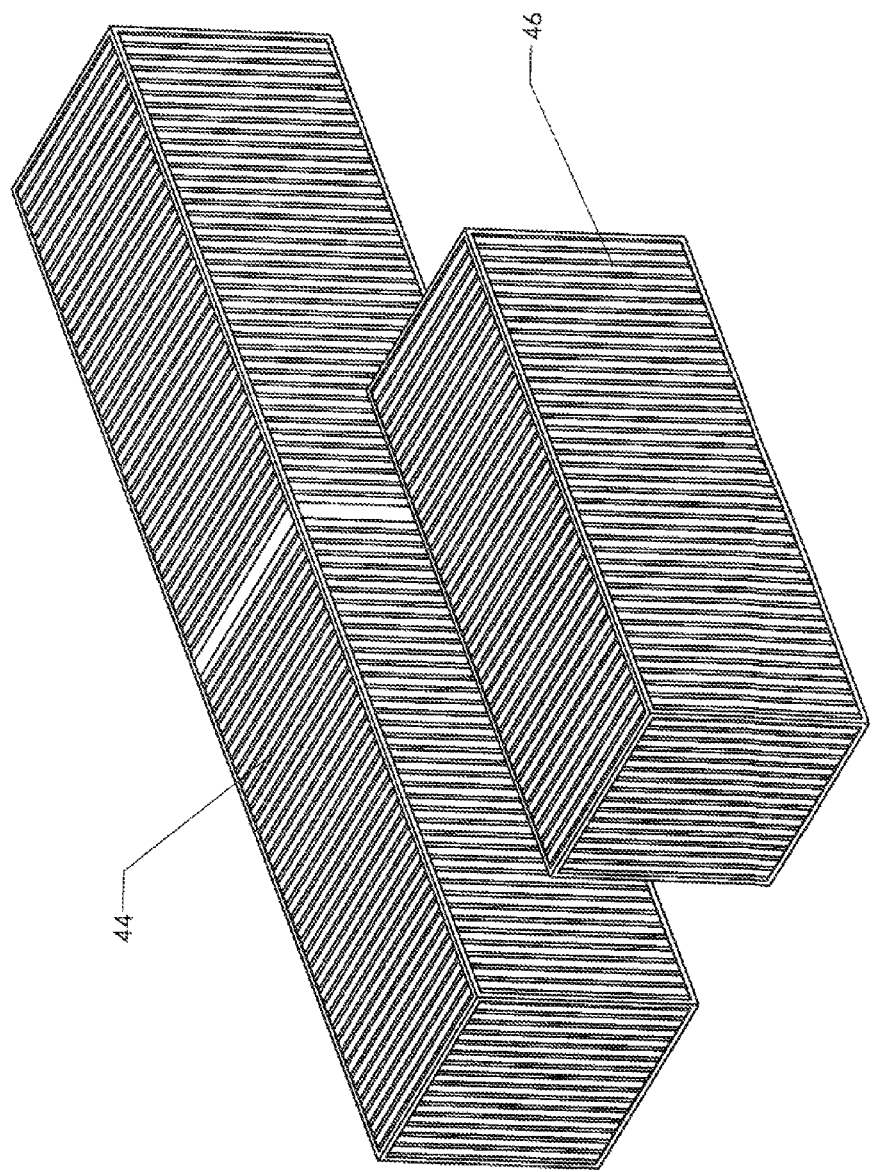
FIG. 2 is a perspective view, showing two prior art cargo containers.

The major components of the invention as applied to a geothermal source are depicted schematically in FIG. 1. Those skilled in the art will realize that heat engines designed for particular applications may have one or more turbines (or multiple stages in a single turbine), multiple condensers, multiple boilers, etc. The enhanced geothermal injection and return system will likewise typically include multiple injection wells and multiple return lines. The feed pump may be a conventional electrically-driven device or it may be a shuttle-type "pump" which uses intermediate shuttle tanks to transfer working fluid between the low-pressure side of the system and the high-pressure side of the system by sequencing valves to sequentially fill, pressurize, and dump one or more shuttle tanks. The present invention encompasses all these variations. However—in the interest of brevity—only the relatively simple embodiment shown in FIG. 1 has been illustrated in detail.

Figure 3:
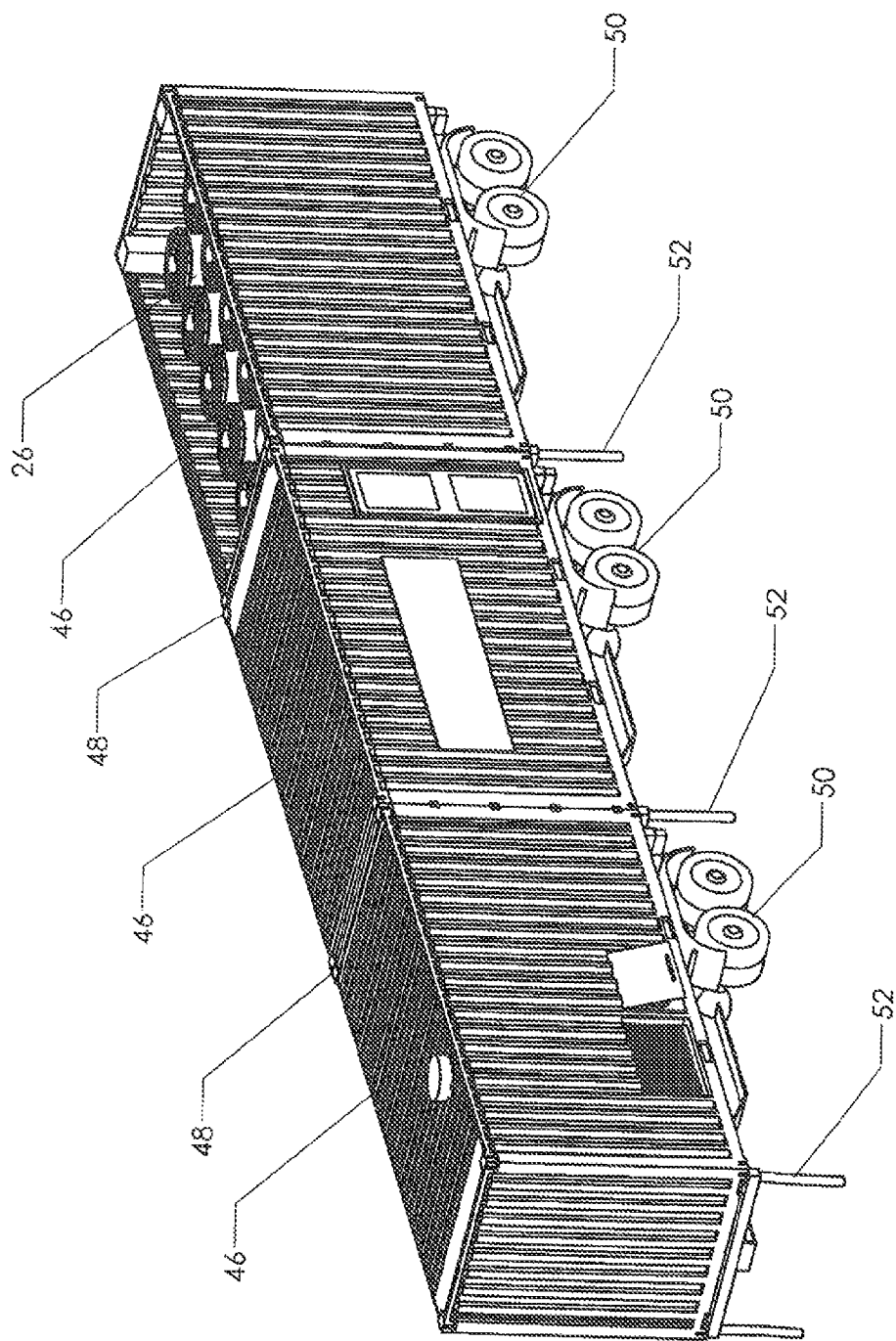
FIG. 3 is a perspective view, showing the use of cargo containers to house the present modular energy harvesting system.

A single energy harvesting module may be configured in a variety of ways. FIG. 3 shows an embodiment in which three twenty foot containers 46 have been connected via two joints 48. As is known in the shipping industry, each container may be placed on a transport carrier 50 so that it may easily be moved by road. Once placed in the desired location, the three containers are connected together and multiple jack posts 52 are lowered to, provide stability.

Transport carriers 50 may be removed if desired. It is also possible to set the containers on a more conventional foundation rather than using the jack posts for support. Whatever foundation is used, the reader will appreciate that the power harvesting module illustrated may be conveniently transported to the installation site.

Shipping containers are standardized at twenty foot and forty foot lengths in the shipping industry. The present invention may be housed in containers having standard lengths or non-standard lengths. As an example, all the components could be housed in a single sixty foot long container.

The embodiment shown in FIG. 3, however, does user three standard twenty foot containers. The third of the three twenty foot containers 46 contains a condenser 26. This container is preferably configured so that the condenser, may be raised above the rest of the energy harvesting module.

Figure 4:
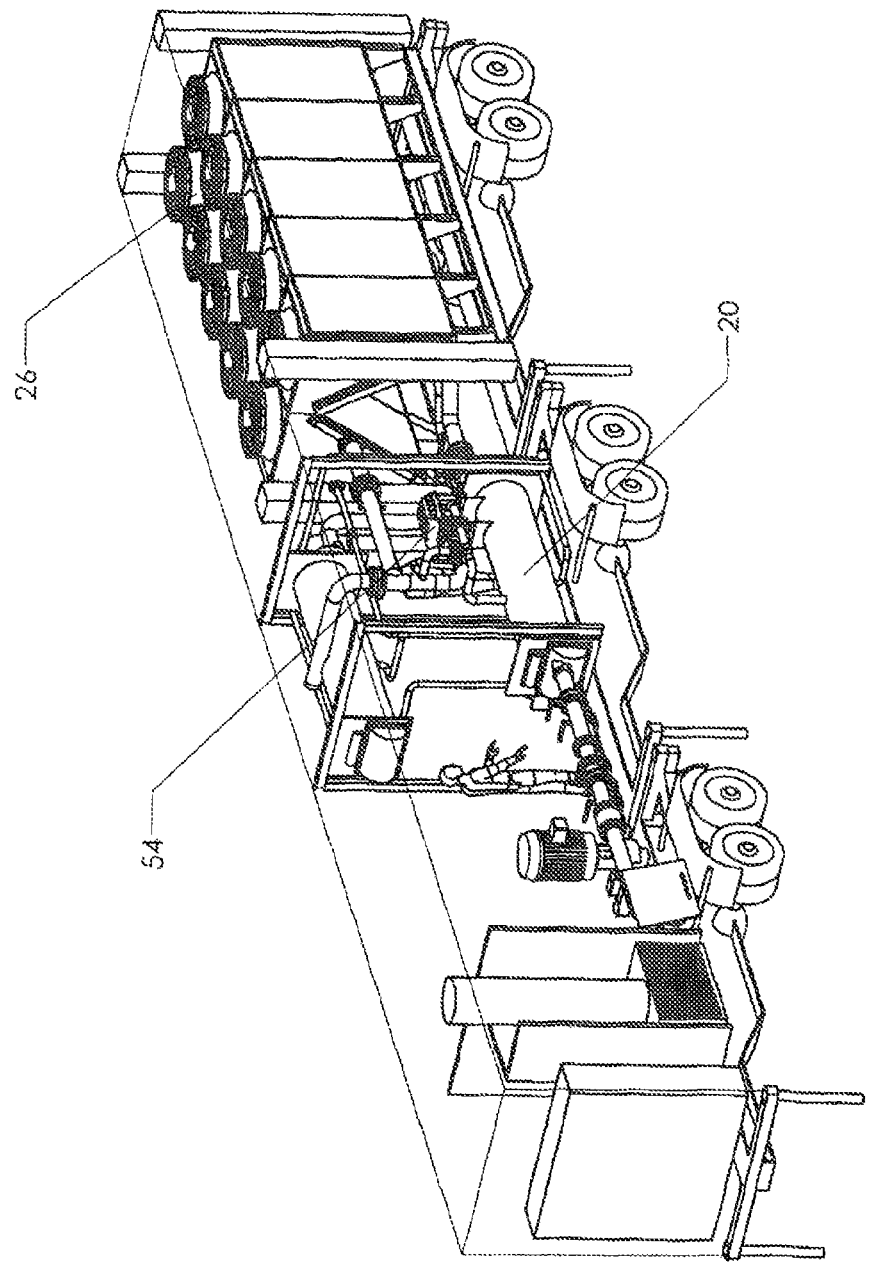
FIG. 4 is a perspective view, showing the major components of the present invention.

FIG. 4 shows the interior of the three linked containers. In this embodiment, the first two containers house turbine/generator 54, boiler 20, and the associated plumbing and controls. The particular configuration and location of the circulating heat engine hardware may be changed as desired. Turbine/generator 54 is preferably an integrated unit housing a one or more stage expansion turbine driving an electrical generator. The turbine/generator is preferably an oil-less unit incorporating magnetic bearings. The generator is preferably a homopolar motor producing DC power.

While a detailed discussion of the turbine/generator unit is beyond the scope of this disclosure, the reader's attention is directed to existing patents covering oil-less HVAC compressor designs using similar technology. These patents are U.S. Pat. No. 5,070,704 to Conry; U.S. Pat. No. 5,857,348 to Conry; and U.S. Pat. No. 7,240,515 to Conry. All of these patents are hereby incorporated by reference.

Thus, each energy harvesting module is a self-contained electrical power generating unit that requires only a heat source to vaporize the working fluid in the boiler. The heat source may assume a variety of forms. However, in the preferred embodiments, the heat source is a supply of circulating hot water Condenser 26 is configured to reside within the third container during shipping. However, it is not intended to operate in this position. Returning briefly to FIG. 1, the reader will recall that condenser 26 takes in the turbine exhaust gas and condenses it back to liquid form. The condensed liquid exits the condenser through condenser suction line 38, which leads to feed pump 18. The feed pump pressurizes the working fluid so that it may be fed into the "high side" of the heat engine (the boiler).

Those skilled, in the art will know that it is undesirable to feed any significant amount of vaporized working fluid, into feed pump 18, as this may cause cavitation. Cavitation is typically damaging to the pump impeller. It also interrupts the flow of the system and may "vapor lock" the circulation. Thus, it is desirable to ensure that the working, fluid is 100% liquid by the time it reaches the pump intake.

One effective way to accomplish this goal is to raise the condenser significantly above the level of the feed pump intake (so that the height provides additional head to the pump intake, which is located at-.a lower level). However—as shown in FIG. 4—it is desirable to have the condenser contained within the shipping container while the energy harvesting module is being transported. In order to solve this issue, the shipping container housing the condenser is preferably configured so that the condenser may be raised to :a higher position before the heat engine is placed in operation.

Figure 5:
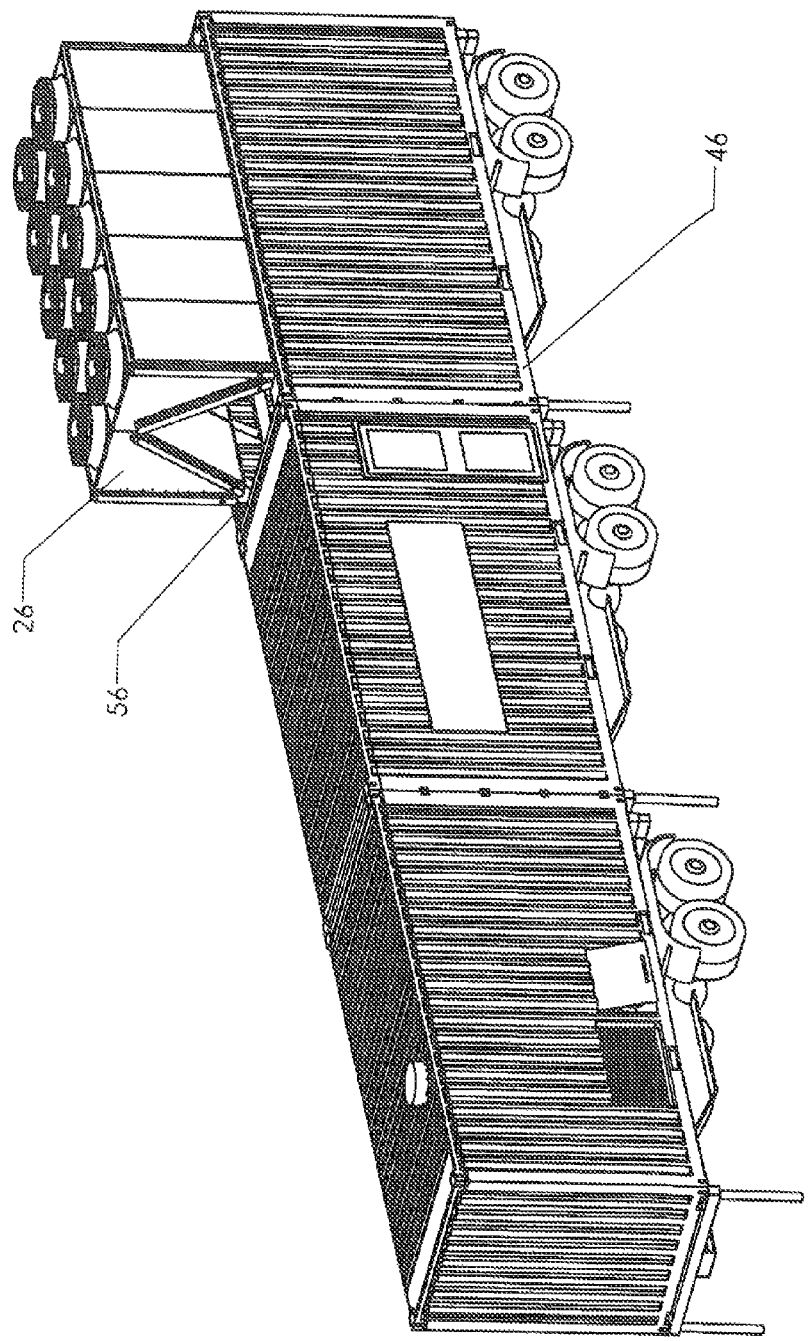
FIG. 5 is a perspective view, showing the components of FIG. 4 with the condenser in a raised position.

FIG. 5 shows the energy harvesting module with condenser 26 in a raised position. The condenser may be raised by any suitable mechanism. One approach is to provide a lifting mount 56 as part of the container itself. The lifting mount may include chain hoists, screw drives, or other known mechanisms for raising a platform. Alternatively, an external device (such as a crane) may be used to lift the condenser into the elevated position shown. Fixing hardware may then be used to retain the condenser in the elevated position.

Figure 6:
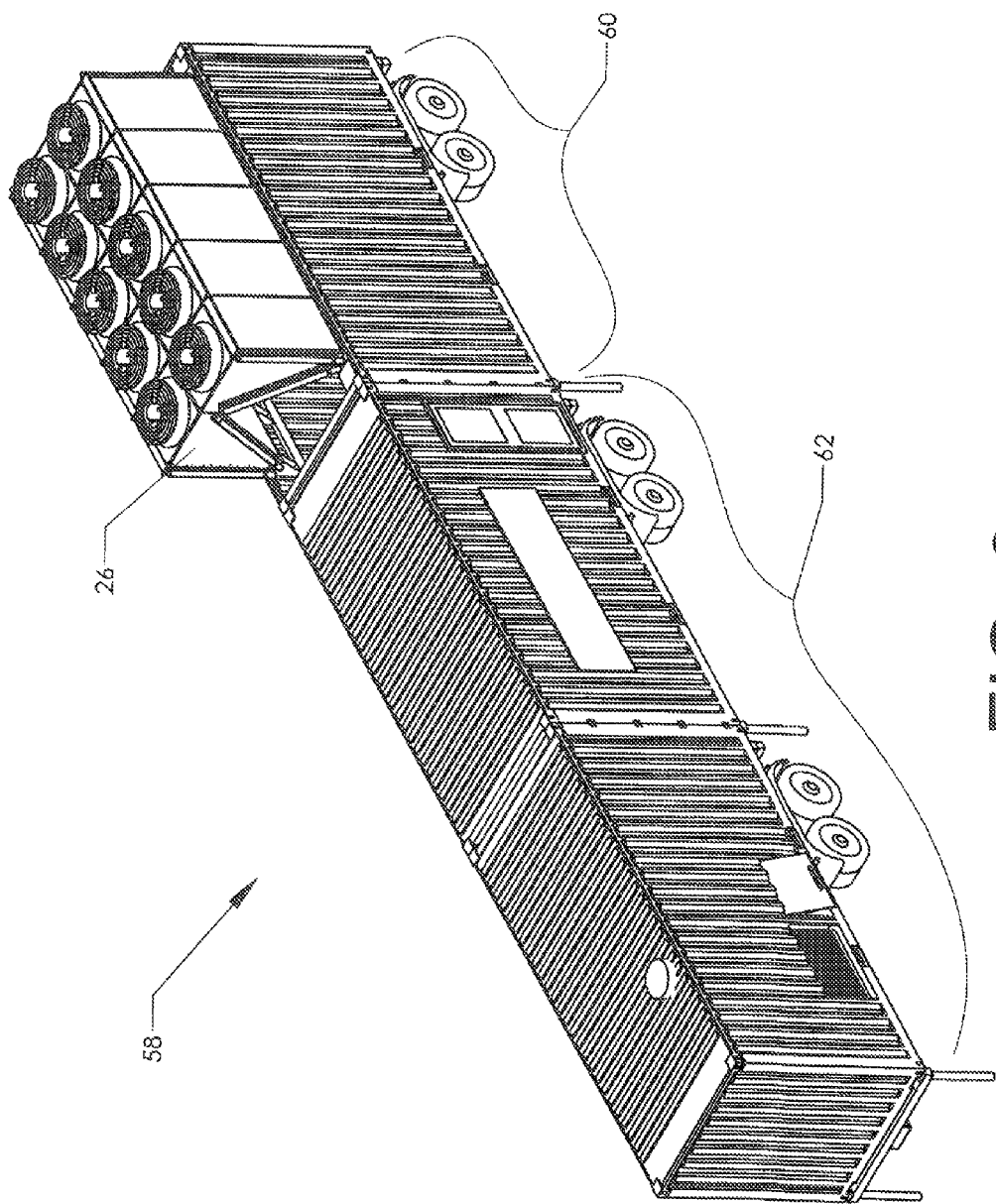
FIG. 6 is a perspective view, showing the components of FIG. 5 from a different perspective position.

Once the condenser is, suitably elevated, the piping connections are made to the rest of the heat engine. These connections preferably include flex fittings so that some relative movement of the components may be accommodated:

FIG. 6 shows a perspective view of the same assembly from a higher vantage point. This particular power harvesting module 58 is made of three connected twenty foot containers. The last of the three is condenser section 60. The first two comprise turbine section 62. Other embodiments may use a single forty foot container, a combination of twenty and forty foot containers, or a container or containers of custom length.

Figure 7:
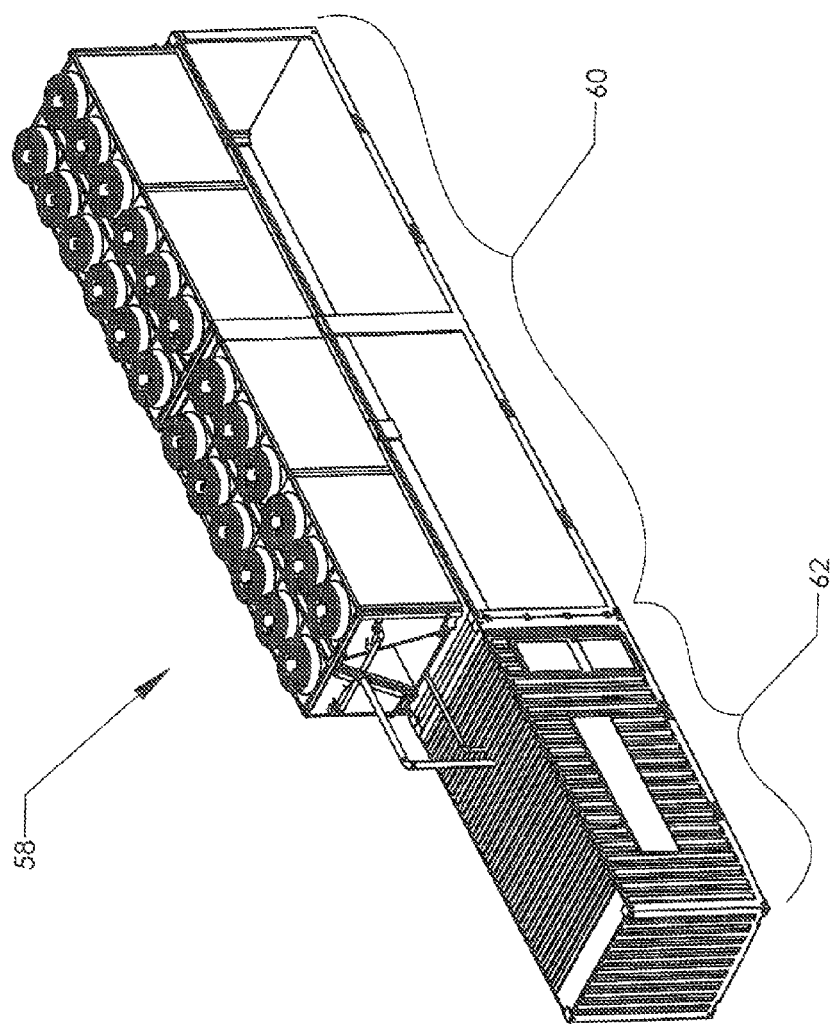
FIG. 7 is a perspective view, showing an embodiment using two condenser assemblies.

Those knowledgeable in the field will know that the condenser capacity is to some extent dependent on the ambient temperature available to the heat engine. In some environments the condenser will require more, functional surface area. FIG. 7 shows such an example. In this embodiment, turbine section 62 is housed within a single twenty foot container. Condenser section 60, however, includes two twenty foot containers housing two condenser units.

The reader should, note that the shipping containers used for the present invention may or may not be standard containers. It is desirable that the containers use standard width and height dimensions, however, so that they may be handled and transported using existing equipment. The containers used for the condensers in the example of FIG. 7 are non-standard in that they are open on the sides and tops. The condenser units themselves are manufactured to be all-weather, durable units. Thus, it is not always necessary to enclose them within a sealed container.

Figure 8:
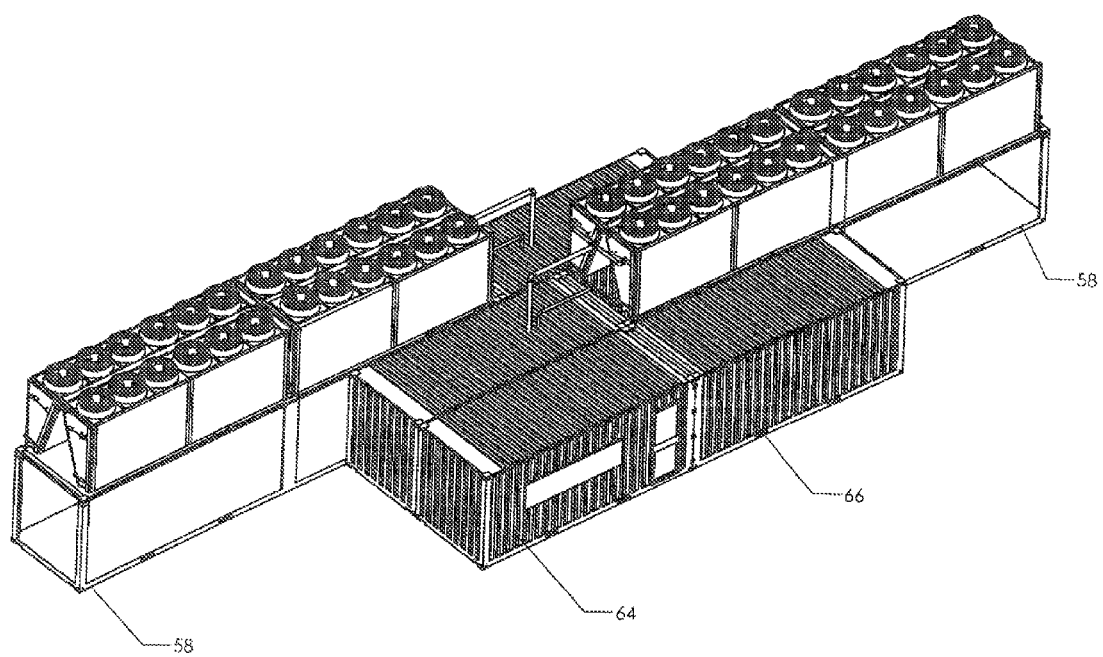
FIG. 8 is a perspective view, showing the linking of two modular assemblies.

The use of the modular design allows the invention to be highly scalable. A single energy harvesting module can be quickly placed on site to provide electricity. Additional modules can be added as the site is expanded. FIG. 8 shows an embodiment in which two energy harvesting modules 58 are operating together.

It is preferable to provide a single control area for multiple modules. Thus, control room 66 is added to link the control of the energy harvesting modules together. It may also be desirable to unify the electrical power from one or more modules into a single output. Power transmission unit 64 is provided for this purpose. The output of each turbine/generator is preferably DC electrical power. The DC output from each module may be fed into power transmission unit 64. In some embodiments, the power transmission unit includes equipment for converting the DC power into a single AC output. In other embodiments the DC output from each module may be combined and transmitted as DC power. Of course, it is also possible to provide multiple different outputs having different voltages. Some of the multiple outputs may be AC while others may be DC.

Figure 9:
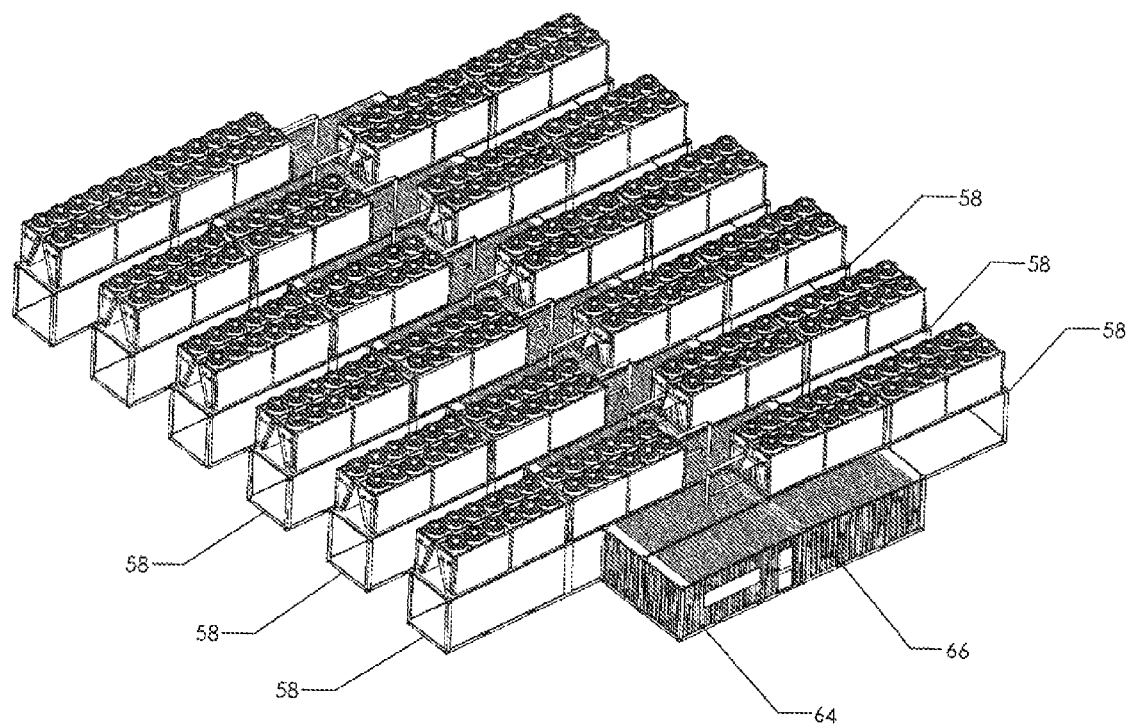
FIG. 9 is a perspective view, showing the linking of twelve modular assemblies.

The modular nature of the system allows it to be scaled well beyond two modules. FIG. 9 shows an embodiment in which twelve energy harvesting modules have been placed on a single site. All these modules are controlled by a single control room 66 and they all feed into a single power transmission unit.

Figure 10:
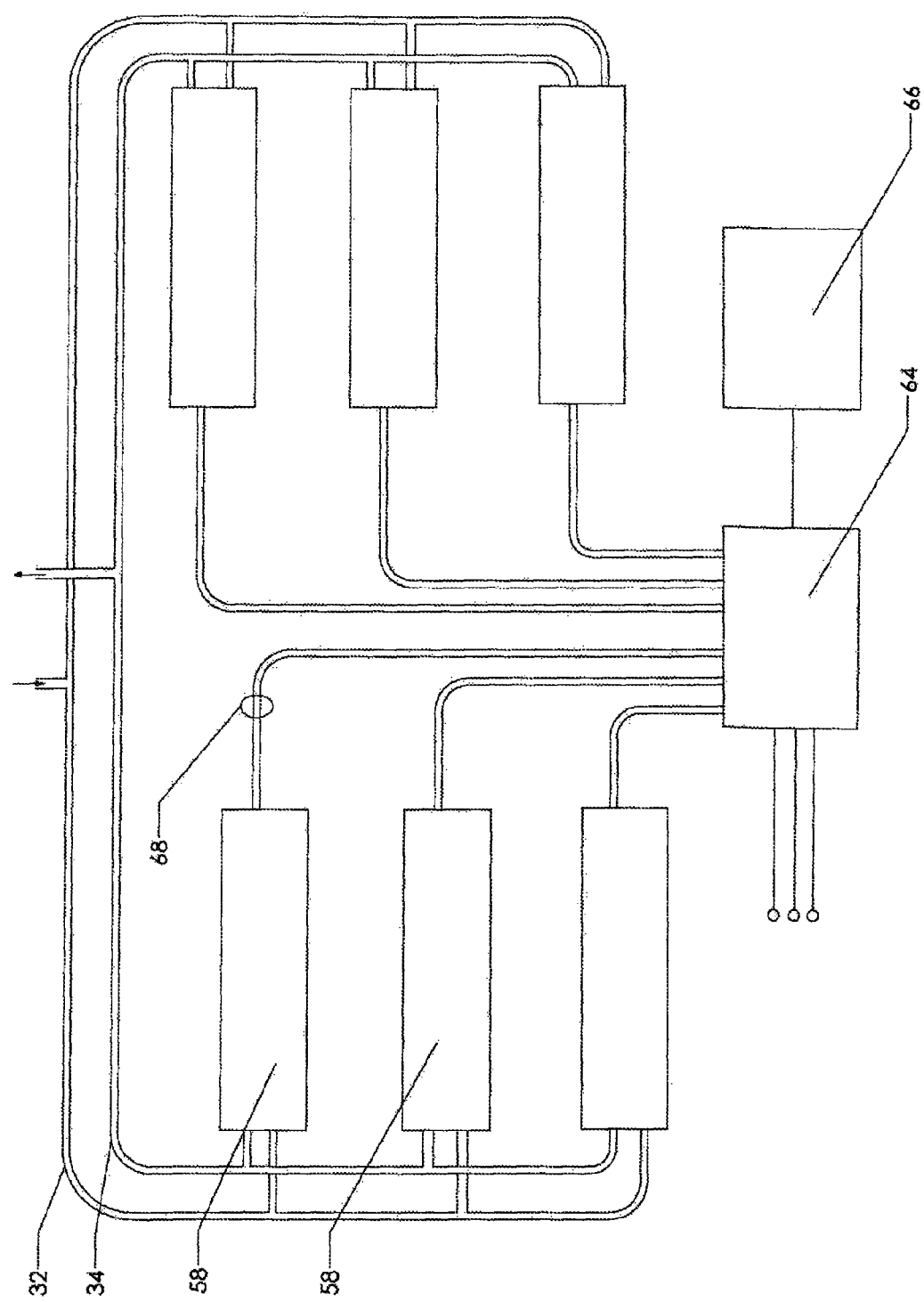
FIG. 10 is a schematic view depicting the assembly of FIG. 9.

FIG. 10 schematically depicts how energy from an available heat source may be transmitted into the energy harvesting modules. The example shown corresponds to an enhanced geothermal site. Hot pressurized water is fed in through hot water line 32. Each energy harvesting module is provided with hot water from this hot water line. Each module also has a water return line which feeds into water return line 34. Thus, hot water is fed from the geothermal return wells and the cooler water returned from each energy harvesting module is fed back to the geothermal injection wells.

DC feed lines 68 from each energy harvesting module are also combined in power transmission, unit 64. The connections shown in FIG. 10 suggest the use of a large surface area, but this will not be true for most embodiments. The preferred embodiments will incorporate integrated plumbing connections so that each module may easily be connected to its neighbor with a minimum of external plumbing.

Figure 11:
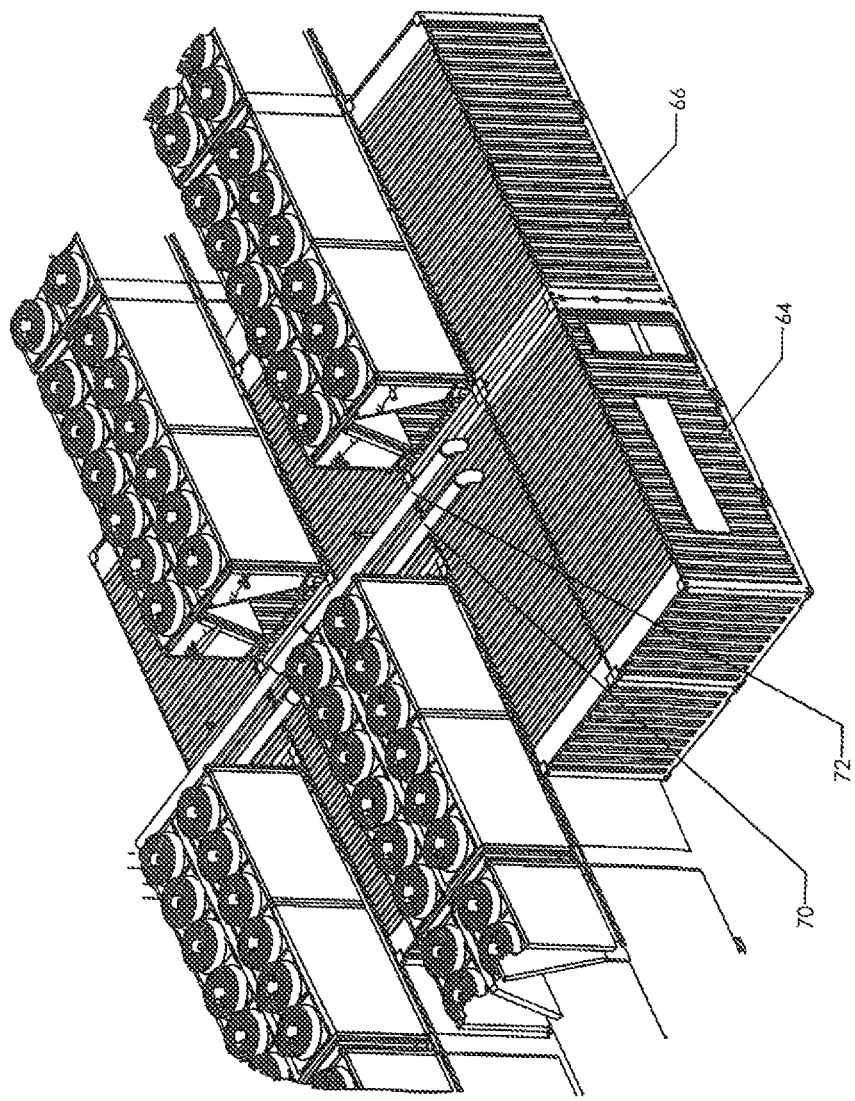
FIG. 11 is a perspective view, showing the use of an intake line and a discharge line to circulate the heated working fluid through the energy harvesting modules.

FIG. 10 does not depict how the feed lines would actually look. FIG. 11 does provide such a depiction. It is preferable to provide modular feed line connections so that additional energy harvesting nodules may be added without having to significantly alter the system. FIG. 11 shows a detailed view of a portion of the array of energy harvesting modules that are depicted in FIG. 9. Hot fluid header 70 carries in the hot pressurized water from the geothermal source. Tee connections (and elbow connections on the very end of the lines) carry the hot water into each energy harvesting module.

Likewise, return fluid header 72 carries the return water from each of the modules back to the injection wells. The headers are preferably made of a series of pipes linked by flanges or other suitable connectors. The pipes may even be incorporated in the containers of the energy harvesting modules themselves.

Although the preceding description contains significant detail, it should not be construed as limiting the scope of the invention but rather as providing illustrations of the preferred embodiments of the invention. The inventive process could be carried out in many different ways. Thus, the scope of the invention should be fixed by defining claims rather than the examples given.

Having described my invention, I claim:

1. A method for harvesting energy from a source of pressurized hot water, comprising:
    a. providing a first organic Rankine cycle heat engine, including,
        i. a first boiler, a first turbine, a first condenser, and a first feed pump,
        ii. a first circulating loop connecting said first boiler, first turbine, first condenser, and, first feed pump,
        iii. wherein said first circulating loop contains a working fluid,
        iv. a first hot water line leading into said first boiler, said first hot water line configured to receive said pressurized hot water, and
        v. a first water return line leading out of said boiler, said first water return line configured to discharge said pressurized hot water after said pressurized hot water has passed through said first boiler;
        v. wherein said first organic Rankine cycle heat engine is housed in one or more portable containers configured to be transported to said source of pressurized hot water;
    b. providing a second organic Rankine cycle heat engine, including,
        i. a second boiler; a second turbine, a second condenser, and a second feed pump,
        ii. a second circulating loop connecting said second boiler, second turbine, second condenser; and second feed pump,
        iii. wherein said second circulating loop contains a working fluid,
        iv. a second hot water line leading into said second boiler, said hot water line configured to receive said pressurized hot water, and
        v. a second water return line leading out of said second boiler, said second water return line configured to discharge said pressurized hot water after said pressurized hot water has passed through said second boiler;
        vi. wherein said second organic Rankine cycle heat engine is housed in one or more portable containers configured to be transported to said source of pressurized hot water;
    c. transporting said first and second, organic Rankine cycle heat engines to said source of pressurized hot water;
    d. assembling said first and second organic Rankine cycle heat engines;
    e. connecting said pressurized hot water to said first hot water line in said first organic Rankine cycle heat engine and to said second hot water line in said second organic Rankine cycle heat engine, wherein said first and second hot water lines are connected in parallel; and
    e. passing said pressurized hot water through said first and second boilers in said first and second organic Rankine cycle heat engines, thereby transferring energy to said working fluid.

2. A method for harvesting energy from a source of pressurized hot water as recited in claim 1, further comprising connecting said first and second water return lines in parallel.

3. A method for harvesting energy from a source of pressurized hot water as recited in claim 1, wherein:
    a. said source of hot pressurized water is a circulating loop passing through a deep rock formation, said circulating loop including an injection well sending water into said deep rock formation and a return well retrieving water from said deep rock formation;
    b. said first and second hot water lines of said first and second organic Rankine cycle heat engines are connected to said return well; and
    c. said first and second water return lines of said first and second organic Rankine cycle heat engines are connected to said injection well.

4. A method for harvesting energy from a source of pressurized hot water as recited in claim 1, further comprising:
    a. providing a plurality of additional organic Rankine cycle heat engines, each of which has the same components as said first and second organic Rankine cycle heat engines, each of which is housed in one or more portable containers configured to be transported to said source of pressurized hot water;
    b. transporting said plurality of additional organic Rankine cycle heat engines to said source of pressurized hot water;
    c. assembling said plurality of additional organic Rankine cycle heat engines;
    d. connecting said pressurized hot water to said hot water lines of said organic Rankine cycle heat engines, wherein said hot water lines are connected in parallel; and e. passing said pressurized hot water through said boilers in said organic Rankine cycle heat engines, thereby transferring energy to said working fluid.

5. A method for harvesting energy from a source of pressurized hot water as recited in claim 4, further comprising connecting said water return lines in parallel.

6. A method for harvesting energy from a source of pressurized hot water as recited in claim 4, wherein:
   a. said source of hot pressurized water is a circulating loop passing through a deep rock formation, said circulating loop including an injection well sending water into said deep rock formation and a return well retrieving water from said deep rock formation;
   b. said hot water lines of said organic Rankine cycle heat engines are connected to said return well; and
   c. said water return lines of said organic Rankine cycle heat engines are connected, to said injection well.

7. A method for harvesting energy from a source of pressurized hot water as recited in claim 1, wherein each of said turbines is connected to an electrical generator.

8. A method for harvesting energy from a source of pressurized hot water as recited in claim 7, wherein each of said, generators is electrically connected in parallel.

9. A method for harvesting energy from a source of pressurized hot water as recited in claim, 6, wherein each of said turbines is connected to an electrical generator.

10. A method for harvesting energy from a source of pressurized hot water as recited in claim 9, wherein each of said generators is electrically connected in parallel.

11. A method for harvesting energy from a source of pressurized hot water, comprising:
   a. providing a first organic Rankine cycle heat engine, including,
      i. a first boiler, a first turbine, a first condenser, and a first feed pump,
      ii. a first circulating loop connecting said first boiler, first turbine, first condenser, and first feed pump,
      iii. wherein said first circulating loop contains a working fluid,
      iv. a first hot water line leading into said first boiler, said first hot water line configured to receive said pressurized hot water, and
      v. a first water return line leading out of said boiler, said first water return line configured to discharge said pressurized hot water after said pressurized hot water has passed through said first boiler;
      vi. wherein said first organic Rankine cycle heat engine is housed in one or more portable containers configured to be transported to said source of pressurized hot water;
      vii. wherein said first circulating loop is created by connecting components once said first organic Rankine cycle heat engine is on site near said source of pressurized hot water;
   b. providing a second organic Rankine cycle heat engine, including,
      i. a second boiler, a second turbine, a second condenser, and a second feed pump,
      ii. a second circulating loop connecting said second boiler, second turbine, second condenser, and second feed pump,
      iii. wherein said second circulating loop contains a working fluid,
      iv. a second hot water line leading into said second boiler, said hot water line configured to receive said pressurized hot water, and
      v. a second water return line leading out of said second boiler, said second water return line configured to discharge said pressurized hot water after said pressurized hot water has passed through said second boiler;
      vi. wherein said second organic Rankine cycle heat engine is housed in one or more portable containers configured to be transported to said source of pressurized hot water,
      vii. wherein said second circulating loop is created by connecting components once said second organic Rankine cycle heat engine is on site near said source of pressurized hot water;
   c. transporting said first and second organic Rankine cycle heat engines to said source of pressurized hot water;
   d. assembling said first and second organic Rankine cycle heat engines;
   e. connecting said pressurized hot water to said first hot water line in said first organic Rankine cycle heat engine and to said second hot water line in said second organic Rankine cycle heat engine, wherein said first and second hot water lines are connected in parallel; and
   e. passing said pressurized hot water through said first and second boilers in said first and second organic Rankine cycle heat engines, thereby transferring energy to said working fluid.

12. A method for harvesting energy from a source of pressurized hot water as recited in claim 11, further comprising connecting said first and second water return lines in parallel.

13. A method for harvesting energy from a source of pressurized hot water as recited in claim 11, wherein:
   a. said source of hot pressurized water is a circulating loop passing through a deep rock formation, said circulating loop including an injection well sending water into said deep rock formation and a return well retrieving water from said deep rock formation;
   b. said first and second hot water lines of said first and second organic Rankine cycle heat engines are connected to said return-well; and
   c. said first and second water return lines of said first and second organic Rankine cycle heat engines are connected to said injection well.

14. A method for harvesting energy from a source of pressurized hot water as recited in claim 11, further comprising:
   a. providing a plurality of additional organic Rankine cycle heat engines, each of which has the same components as said first and second organic Rankine cycle heat engines, each of which is housed in one or more portable containers configured to be transported to said source of pressurized hot water;
   b. transporting said plurality of additional organic Rankine cycle heat engines to said source of pressurized hot water;
   c. assembling said plurality of additional organic Rankine cycle heat engines;
   d. connecting said pressurized hot water to said hot water lines of said organic Rankine cycle heat engines, wherein said hot water lines are connected in parallel; and
   e. passing said pressurized hot water through said boilers in said organic Rankine cycle heat engines, thereby transferring energy to said working fluid.

15. A method for harvesting energy from a source of pressurized hot water as recited in claim 14, further comprising connecting said water return lines in parallel.

16. A method for harvesting energy from a source of pressurized hot water as recited in claim 14, wherein:

a. said source of hot pressurized water is a circulating loop passing through a deep rock formation, said circulating loop including an injection well sending water into said deep rock formation and a return well retrieving water from said deep rock formation;
b. said hot water lines of said organic Rankine cycle heat engines are connected to said return well; and
c. said water return lines of said organic Rankine cycle heat engines are connected to said injection well.

17. A method for harvesting energy from a source of pressurized hot water as recited in claim 11, wherein each of said turbines is connected to an electrical generator.

18. A method for harvesting energy from a source, of pressurized hot-water as recited in claim 17, wherein each of said generators is electrically connected in parallel.

19. A method for harvesting energy from a source of pressurized hot water as recited in claim 16, wherein each of said turbines is connected to an electrical generator.

20. A method for harvesting energy from a source of pressurized hot water as recited in claim 19, wherein each of said generators is electrically connected in parallel.

* * * * *